Dec. 27, 1966    R. V. SHAFFER    3,294,893
APPARATUS FOR CONTROLLING BIRD NUISANCE
Filed June 25, 1962
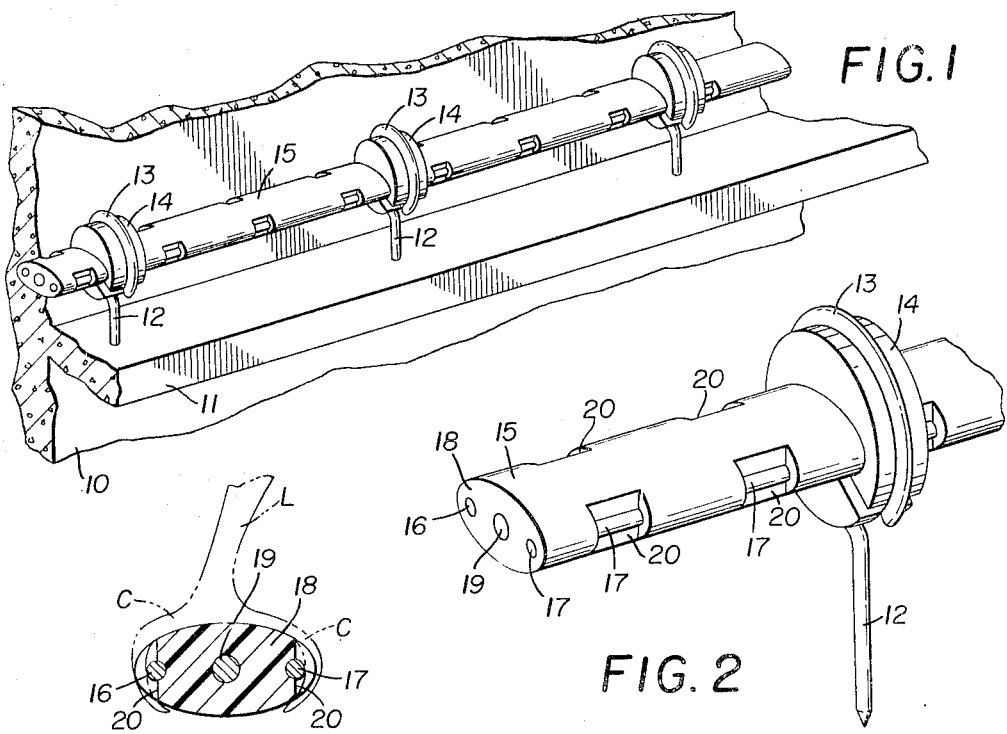
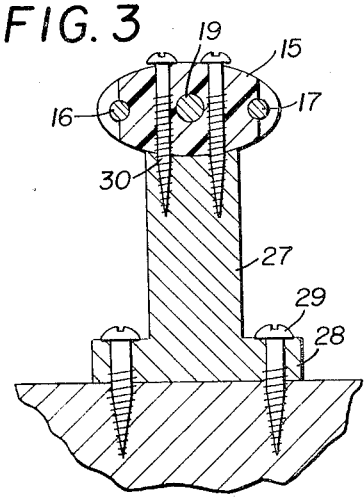
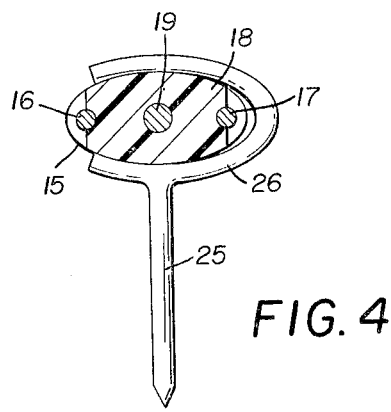
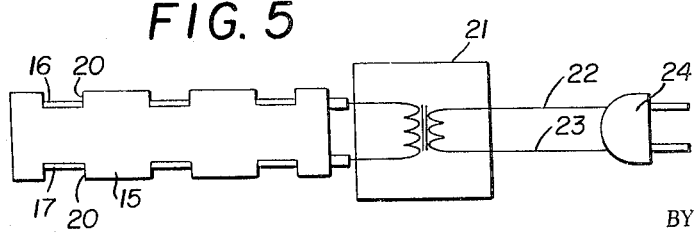
INVENTOR.
ROBERT V. SHAFFER
BY
ATTORNEY United States Patent Office 3,294,893
Patented Dec. 27, 1966

3,294,893
APPARATUS FOR CONTROLLING
BIRD NUISANCE
Robert V. Shaffer, 25 Erskine Ave.,
Youngstown, Ohio 44512
Filed June 25, 1962, Ser. No. 204,845
2 Claims. (Cl. 174—70)

This invention relates to apparatus for controlling bird nuisances and more particularly to a means incorporating electrical conductors so that birds alighting thereon will be shocked and frightened and caused to leave.

The term bird nuisance is used herein to define a condition in which birds, such as pigeons, starlings and the like, congregate at a resting place and render the vicinity of such resting place unattractive and unpleasant due to their droppings and the noise they create.

The principal object of the invention is the provision of apparatus which may be readily installed to control a bird nuisance.

A further object of the invention is the provision of an apparatus for controlling a bird nuisance and which apparatus includes electrical conductors arranged so that only birds can be shocked thereby.

A still further object of the invention is the provision of apparatus which may be economically made and readily installed on building structures to prevent birds from sitting thereon.

A still further object of the invention is the provision of apparatus incorporating an inexpensive electric circuit device arranged so that a bird alighting thereon will short the apparatus and thereby be shocked and caused to leave.

This invention relates to apparatus for controlling bird nuisances and which apparatus comprises a novel double conductor insulated cable preferably having a strengthening wire incorporated therein and wherein spaced oppositely disposed areas of the electrical conductors are barred by notches in the insulating material so that the feet of birds setting thereon will short the electrical conductors.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a perspective view of a portion of a building and ledge with the bird nuisance controlling apparatus installed thereon.

FIGURE 2 is an enlarged perspective view of a section of the electrical conductor comprising the apparatus and a standoff mounting device for supporting the same.

FIGURE 3 is a cross sectional view on an enlarged scale showing the electrical conductor comprising the apparatus with broken lines illustrating a portion of a bird's foot and claws.

FIGURE 4 is a cross sectional elevation of a portion of the electrical conductor comprising the apparatus showing a modified standoff mounting device.

FIGURE 5 is a cross sectional elevation of a portion of the electrical conductor comprising the apparatus showing a modified standoff mounting device.

FIGURE 6 is a schematic diagram of an electrical circuit for the apparatus for controlling bird nuisances.

By referring to the drawings and FIGURE 1 in particular, it will be see that a portion of a building wall 10 having a projecting ledge 11 thereon is illustrated. It will occur to those concerned that such a ledge is commonly used by birds with the attendant nuisance created thereby. As seen in FIGURE 1, a plurality of standoff insulators comprising metal rods 12 having eyelets 13 in their upper ends and insulating apertured inserts 14, 14 positioned therein are positioned partially within the structure of the ledge 11 as by engaging the same in a mortar joint in a masonry construction or by driving the same into the ledge 11 in the event of a wood or metal construction. The standoff insulators 12 serve to support a two conductor insulated cable 15 in parallel spaced relation to the ledge 11 and in spaced relation to the wall 10. The cable 15 as best seen in enlarged detail in FIGURES 2, 3 and 4 and 5 of the drawings includes a pair of electrical conductors 16 and 17 positioned adjacent the outer sides of an elongated insulating body member formed of flexible dielectric material 18 such as synthetic resin or polyethylene and preferably including an axially positioned supporting wire 19. The insulating body member 18, the conductors 16 and 17 and the supporting wire 19 comprise the cable 15.

By referring to FIGURES 1, 2 and 3 of the drawings, it will be seen that notchtes 20, 20 are formed in the insulating member 18 in longitudinally spaced oppositely disposed relation so that oppositely disposed side portions of the conductors 16 and 17 are exposed in the notches 20, 20.

In FIGURE 3 of the drawings, broken lines illustrate a portion of a bird's leg L with the claws C thereof engaged in a pair of the oppositely disposed notches 20, 20 and thereby contacting the exposed conductors 16 and 17 so that an electrical circuit connected with the conductors 16 and 17 will be effectively shorted by the bird's claws so that the bird will be shocked and caused to leave the cable 15 showing the notches 20, 20 and the conductors 16 and 17 will be seen connected in an energizing electrical circuit including a transformer 21, the one side of which is connected by conductors 22 and 23 with a connection plug 24 which may be conveniently connected to a suitable electrical outlet. Those skilled in the art will observe that the cable 15 may be mounted on a building in various ways and two additional methods are illustrated in FIGURES 4 and 5 of the drawings.

In FIGURE 4 of the drawings, a pointed metal member 25 having a partially open oval shaped upper end portion 26 directly receives the cable 15 with its conductors 16 and 17 and support wire 19. The resiliency of the flexible dielectric material 18 enables the cable to be distorted sufficiently to be engaged in the partially opened oval 26 of the device.

In FIGURE 5 of the drawings, a bracket 27 having outturned flanges 28 on its olwer ends is affixed by fasteners 29 to a supporting surface such as a building ledge and the cable 15 with its conductors 16 and 17 and supporting wire 19 is attached to the upper end of the bracket 27 by one or more fasteners 30. The cable 15 is sufficiently flexible so that it can be run around corners and bent at relatively sharp angles to accommodate vertical sections as may be necessary between horizontal ledges or locations in which the apparatus for controlling bird nuisance may be installed, and it will occur to those skilled in the art that the principal point of novelty is in the formation of the cable 15 with the notchtes 20 providing contact with the partially exposed spaced conductors 16 and 17.

It will thus be seen that an apparatus for controlling a bird nuisance as disclosed herein meets the several objects of the invention, and having thus described by invention, what I claim is:

1. Apparatus for controlling a bird nuisance and comprising an elongated flexible cable having a dielectric body member and a pair of spaced electrical conductors positioned longitudinally in said flexible cable adjacent the opposite sides of said cable with oppositely disposed areas of each of said electrical conductors being exposed in longitudinally spaced notches formed in said dielectric body member of said cable.

2. Apparatus for controlling a bird nuisance set forth in claim 1 and wherein a support wire is disposed axially in said cable in spaced relation to said conductors.

References Cited by the Examiner
UNITED STATES PATENTS

| | | | |
|---|---|---|---|
| 2,647,228 | 7/1953 | Just | 317—262 |
| 2,905,919 | 9/1959 | Lorch et al. | 338—214 |

MILTON O. HIRSHFIELD, *Primary Examiner.*

SAMUEL BERENSTEIN, *Examiner.*

D. YUSKO, *Assistant Examiner.*